United States Patent
Grinberg et al.

(10) Patent No.: US 6,404,397 B1
(45) Date of Patent: Jun. 11, 2002

(54) COMPACT ALL-WEATHER ELECTROMAGNETIC IMAGING SYSTEM

(75) Inventors: Jan Grinberg, Los Angeles; Robin Harvey, Thousand Oaks; Franklin A. Dolezal, Reseda, all of CA (US)

(73) Assignee: Raytheon Company, Lexington, MS (US)

( * ) Notice: Subject to any disclaimer, the term of this patent is extended or adjusted under 35 U.S.C. 154(b) by 0 days.

(21) Appl. No.: 09/529,466

(22) PCT Filed: Aug. 10, 1999

(86) PCT No.: PCT/US99/18155
§ 371 (c)(1),
(2), (4) Date: Aug. 14, 2000

(87) PCT Pub. No.: WO00/09977
PCT Pub. Date: Feb. 24, 2000

Related U.S. Application Data

(60) Provisional application No. 60/095,941, filed on Aug. 10, 1998.

(51) Int. Cl.[7] .............................................. H01Q 19/06
(52) U.S. Cl. ................ 343/753; 343/700 MS
(58) Field of Search ................ 343/753, 754, 343/755, 757, 700 MS; 250/336.1, 338.1, 332; H01Q 1/38, 19/06

(56) References Cited

U.S. PATENT DOCUMENTS

| | | | |
|---|---|---|---|
| 5,760,397 A | * | 6/1998 | Huguenin et al. .......... 250/332 |
| 5,828,344 A | * | 10/1998 | Alder et al. ................ 343/755 |
| 6,242,740 B1 | * | 6/2001 | Luukanen et al. .......... 250/353 |

* cited by examiner

*Primary Examiner*—Hoanganh Le
(74) *Attorney, Agent, or Firm*—William C. Schubert; Glenn H. Lenzen, Jr.

(57) ABSTRACT

The system (10) includes a first mechanism (12) for receiving electromagnetic energy of a first wavelength from the scene (28) and providing electromagnetic energy of a second wavelength shorter than the first wavelength. A second mechanism (14) measures variations of the electromagnetic energy of the second wavelength over a predetermined area. The system is a millimeter wave imaging system (10). The first mechanism (12) includes a lens (12) having an index of refraction substantially greater than 1. The lens (12) is opaque to infrared electromagnetic energy and made of alumina, plastic, or other material having a relatively high index of refraction. The second mechanism (24) includes and array of bolometers (24) positioned parallel to an output aperture (24) of the lens and within a distance of the output aperture (24) that is much smaller than the second wavelength. A video controller (16), a computer (18), process video signals output from the array of bolometers (14) to yield an image, which is displayed on a display (20).

25 Claims, 5 Drawing Sheets

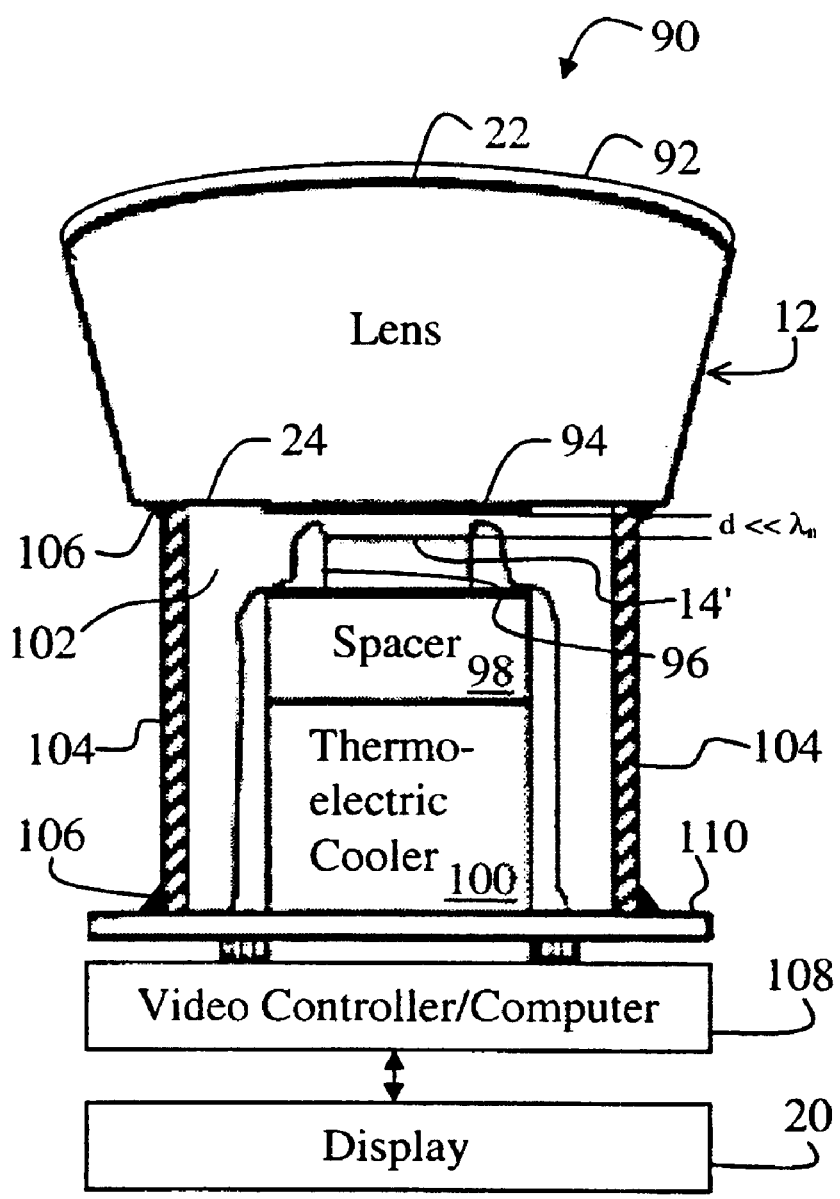

COMPACT ALL-WEATHER ELECTROMAGNETIC IMAGING SYSTEM

CROSS-REFERENCE TO RELATED APPLICATIONS

This application claims benefit of U.S. Provisional Application Ser. No. 60/095,941, filed Aug. 10, 1998.

BACKGROUND OF THE INVENTION

1. Field of Invention

This invention relates to imaging systems. Specifically, the present invention relates to millimeter wave electromagnetic imaging systems.

2. Description of the Related Art

Electromagnetic imaging systems are employed in a variety of demanding applications including security surveillance, aircraft landing, missile guidance, target detection and classification, terrain mapping, and mine detection applications. Such applications require cost-effective, space-efficient, and reliable imaging systems that can provide effective images at night and in adverse weather conditions.

Imaging systems are either passive or active. Both passive and active electromagnetic imaging systems are typically named in accordance with the frequency band of electromagnetic energy employed by the systems.

Active electromagnetic imaging systems, such as radar systems, transmit electromagnetic energy toward a scene and detect the reflected electromagnetic energy to generate an image of the scene. Unfortunately, in warfare applications, an enemy may detect the transmitted electromagnetic energy, making the systems undesirable in many applications.

Passive electromagnetic imaging systems generally lack transmitters. Passive systems detect electromagnetic energy emanating from a scene and convert the energy into electronic signals. Consequently, passive imaging systems are generally immune to enemy detection.

Optical and infrared passive imaging systems are currently in wide spread use. Such systems, however, typically require favorable weather conditions to produce effective mission-enabling images. Clouds, rain, or snow may block optical and infrared electromagnetic energy. Millimeter wave electromagnetic energy however, passes through clouds, rain, and snow with little attenuation. Consequently, millimeter wave imaging systems are generally less sensitive to weather obstructions than their optical and infrared counterparts.

Millimeter wave systems typically employ a focal plane array (FPA) of electromagnetic energy detectors. The detectors convert received millimeter wave electromagnetic energy into electronic signals that are fed to millimeter wave super heterodyne receivers and accompanying microelectronic circuits. The super heterodyne receivers and accompanying microelectronic circuits are expensive, bulky, consume excess power, and typically offer relatively poor resolution.

Electromagnetic diffraction creates detector size versus wavelength design limitations that may further increase system size, especially in systems employing full 256×256 detector FPAs. FPA detectors, also termed FPA pixels, are sized in accordance with wavelength of the electromagnetic energy detected by the system. Typically, the pixels must not be significantly smaller than the wavelength of the detected electromagnetic energy.

In many applications, the present state of the art results in very large systems. Space-constraints necessitate the use of a partial FPA and an accompanying mechanical scanning mechanism. Typically, the scanning mechanism scans the focal plane, taking pixel measurements. The pixel measurements are multiplexed onto a single channel and subsequently provided to image processing circuits such as pixel integration circuits. The mechanical scanning mechanisms may further increase system size and cost while reducing system reliability and performance. In addition, the systems exhibit a trade-off between signal-to-noise ratio (SNR) and image integration time. Image integration time is the time spent correcting signals from each pixel in the FPA. To achieve effective SNRs, the systems may require undesirably long image integration times. Therefore, systems employing mechanical FPA scanners typically cannot operate in real-time and have compromised SNRs. Consequently, conventional millimeter wave imaging systems are impractical in many applications.

Hence, a need exists in the art for a cost-effective, space-efficient, and power-efficient staring electromagnetic imaging system that can produce relatively high-resolution real-time images day or night and in virtually all weather conditions.

SUMMARY OF THE INVENTION

The present invention addresses the need for a low cost, low power consumption, small, lightweight, high performance, millimeter wave imaging system. In the illustrative embodiment, the inventive system adapted for use millimeter wave electromagnetic energy and includes a first mechanism for receiving electromagnetic energy of a first wavelength from a scene and providing electromagnetic energy of a second wavelength in response thereto. The second wavelength is shorter than the first wavelength. A second mechanism measures variations of the electromagnetic energy of the second wavelength over a predetermined area and provides the information about the scene in response thereto.

In a specific embodiment, the system is a millimeter wave imaging system and the first wavelength and the second wavelength are on the order magnitude of millimeters. The variations result from differences of emissivity and/or reflectivity coefficients of features of the scene. The second mechanism includes a section of material having a resistivity that varies in accordance with variations in temperature. A low-frequency video read-out circuit measures changes in the resistivity of the section of material in response to changes in electromagnetic energy received by the section of material. An array of the sections of material, which are bolometers, is thermally isolated from a surrounding environment. The bolometers are included in a full frame bolometer focal plane array.

In a more specific embodiment, the first mechanism includes a lens having an index of refraction greater than 1. The lens is transparent to electromagnetic energy of millimeter wavelengths but generally opaque to infrared electromagnetic energy. The array of bolometers is positioned relative to the lens so that the electromagnetic energy of the second wavelength impinges on the array of bolometers and is absorbed by the same. The array of bolometers is positioned parallel to an output aperture of the lens and within distance d<<λ of the output aperture, where λ is the second wavelength. The operation frequency of the system is between approximately 10 GHz and 10 THz.

In an alternative embodiment, an array of patch antennas receives the electromagnetic energy of the second wavelength and feeds the electromagnetic energy of the second wavelength through apertures in a ground circuit and to a microstrip feed circuit. The microstrip feed circuit includes a first line and a second line along which a first portion of the electromagnetic energy of the second wavelength and a second portion of the electromagnetic energy of the second wavelength propagate, respectively. The first line is longer than the second line by a factor of λ/2, where λ is the second wavelength. A bolometer is connected at a first end to the first line of the microstrip feed circuit and is connected at a second end to the second line of the microstrip feed circuit. An array of the microstrip feed circuits feeds a corresponding array of bolometers. The bolometers of the array are mounted on a substrate and connected to the microstrip feed circuits. The bolometers are enclosed in a vacuum. A low-frequency line-by-line video read-out circuit senses the temperature change due to electromagnetic energy of the second wavelength transferred to the bolometers and provides parallel video signals in response thereto. The second mechanism further includes a mechanism for processing the parallel video signals and displaying an image corresponding to the scene in response thereto. The second mechanism also includes a mechanism for rejecting infrared electromagnetic energy and passing millimeter wave electromagnetic energy. The second mechanism further includes for rejecting includes an antireflectivity layer, and a thermoelectric cooler.

The novel design of the present invention is facilitated by the first mechanism, which reduces the wavelength of input electromagnetic energy. The wavelength reduction results in improved image resolution, enhanced signal-to-noise ratio, and improved image acquisition time. The mechanisms for incorporating an array of thin film bolometers as direct sensors for the millimeter wave radiation obviate the need for expensive super heterodyne receivers and associated microelectronics. These advantages permit use of a full staring focal plane array without accompanying focal plane array scanning mechanisms, which are often slow, expensive, and unreliable.

BRIEF DESCRIPTION OF THE DRAWINGS

FIG. 7 is an illustrative cross-sectional diagram of a millimeter wave imaging system constructed in accordance with the teachings of the present invention and employing the array of FIG. 3.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
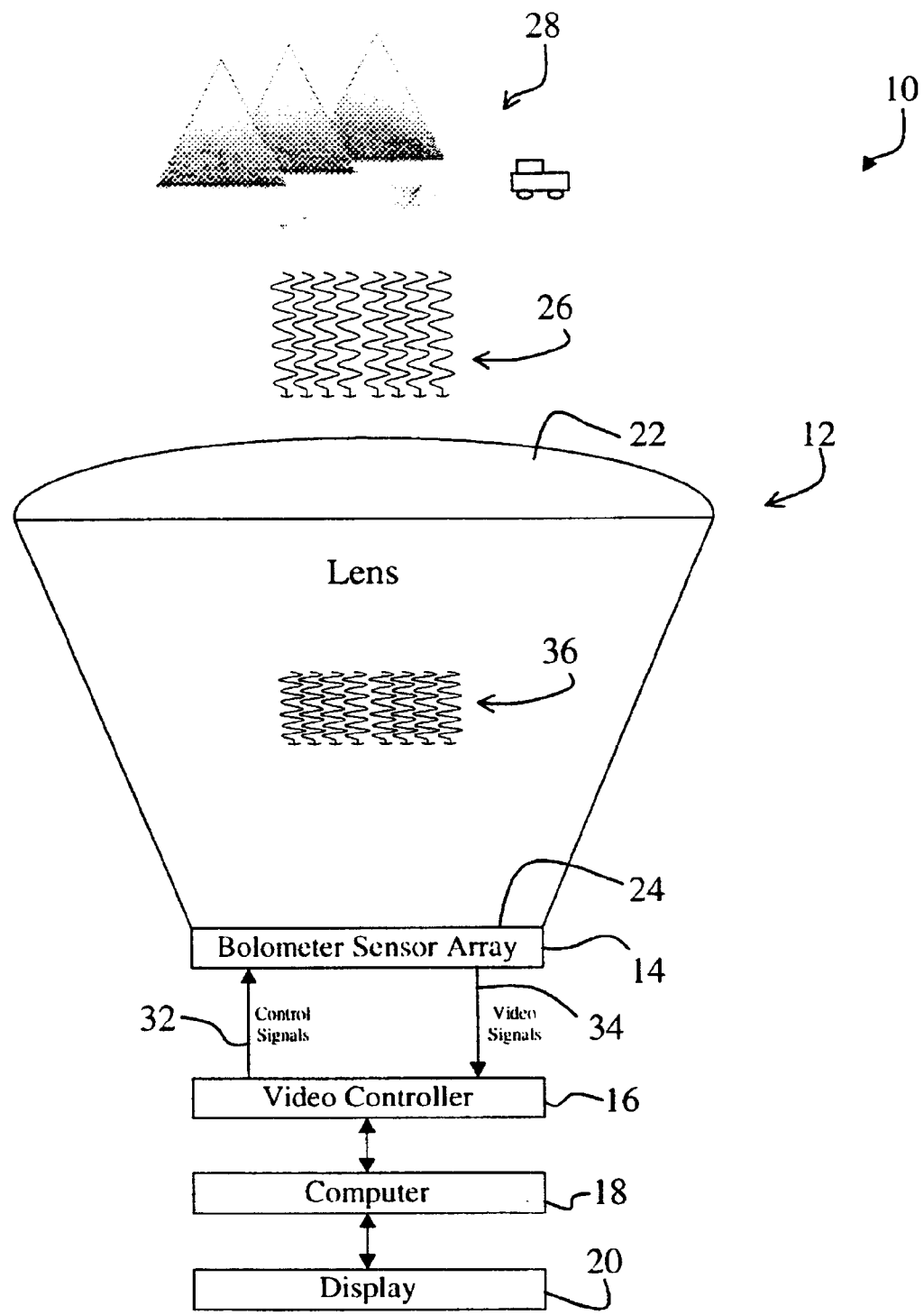
FIG. 1 is a diagram of an imaging system constructed in accordance with the teachings of the present invention showing a special lens, a bolometer sensor array circuit, a video controller, and a computer.

FIG. 1 is a diagram of an imaging system 10 constructed in accordance with the teachings of the present invention showing a special lens 12, a bolometer sensor array circuit 14, a video controller 16, a computer 18, and a display 20. The lens 12 includes an input aperture 22 and an output aperture 24. The bolometer sensor array circuit 14 is mounted to the output aperture 24 of the lens 12. The bolometer sensor array circuit 14 is connected to the video controller 16, which is connected to the computer 18, which is connected to the display 20.

The lens 12 receives electromagnetic energy 26 radiated from a scene 28 via the input aperture 22. The lens 12 is designed to reject infrared electromagnetic energy and pass millimeter wave electromagnetic energy. In the present specific embodiment, the lens 12 is coated with a special anti-reflective layer and an infrared (IR) filter made of silicon carbide, silicon nitride, polyaniline, or other IR-rejecting material, as discussed more fully below, to reduce or eliminate infrared electromagnetic energy propagating through the lens 12.

Electromagnetic energy other than infrared, such as millimeter wave energy, enters the lens 12, which has a predetermined index of refraction. The lens 12 may be implemented as a multi-element lens. In the present embodiment, the lens 12 is a two-element lens and has a first element (not shown) made of rexolite and a second element (not shown) made of alumina. Alumina has an index of refraction of approximately 3. The first element is an objective lens having a concave input aperture and a concave output aperture. The second element has a concave input aperture that faces the concave output aperture of the first element, and has a flat output aperture, which corresponds to the output aperture 24 of the lens 12. The exact material of the lens 12 is application-specific and may be determined by one skilled in the art to meet the needs of a given application. Materials with different indices of refraction may be employed, such as rexolite, polyethylene, alumina, or other material that is transparent to millimeter wave electromagnetic energy. The selected material should have an index of refraction sufficiently large to yield a desired size reduction of the sensor array circuit 14 and a corresponding improvement in image resolution and signal-to-noise ratio (SNR).

The wavelength of electromagnetic energy 36 propagating in the lens 12 is a factor of n shorter than the wavelength of electromagnetic energy 26 propagating in air from the scene 28, where n is the index of refraction of the lens 12. It is known in the art that the wavelength ($\lambda_n$) of electromagnetic energy propagating in a material having an index of refraction (n) differs from the wavelength ($\lambda_o$) of electromagnetic energy propagating in a vacuum, i.e., free space in accordance with the following equation:

$$\lambda_n = \lambda_o / n. \qquad [1]$$

Air has an index of refraction of approximately 1.0. Hence, the wavelength $\lambda_n$ of electromagnetic energy 36 propagating through the lens is approximately a factor of n shorter than the wavelength of electromagnetic energy 26 received from the scene by the lens 12.

The bolometer sensor array circuit 14 includes a full-frame staring bolometer focal plane array, which is enclosed in a vacuum to achieve thermal isolation from the surrounding environment, as discussed more fully below. The bolometer sensor array circuit 14 does not require a mechanical scanning mechanism. The bolometer sensor array circuit 14 senses the millimeter wave electromagnetic energy 36 propagating in the lens 12. The bolometer sensor array circuit 14 is designed to detect and display variations of millimeter wave electromagnetic energy across a predetermined area corresponding to the lens output aperture 24, which is covered by the bolometer sensor array circuit 14.

The detected variations primarily result from differences in emissivity and/or reflectivity coefficients of features of the scene 28. The variations are then converted to video signals 34 via standard video sensor read-out circuitry included in the bolometer sensor array circuit 14. The video signals 34 are then employed by the video controller 16 and standard imaging software running on the computer 18 to display an image representative of the scene 28 on the display 20. Unlike IR systems, which typically rely on temperature gradients between objects within a given scene, the present invention typically employs gradients in emissivity and reflection coefficients of objects within the scene 28 to achieve contrast between the objects within the scene.

As mentioned above, the wavelength of electromagnetic energy 36 detected by the bolometer focal plane array circuit 14 of the present invention is approximately a factor of n shorter than the wavelength of electromagnetic energy 26 detected by conventional electromagnetic imaging systems. The shorter wavelength allows greatly improved image resolution, greatly enhanced SNR, and reduced size and cost, as discussed more fully below.

To take advantage of the shorter wavelength of electromagnetic energy 36 propagating in the lens 12 via the bolometer or sensor array circuit 14, which is positioned in a vacuum (where n=1), requires unobvious and novel design features employed by the present invention, which are discussed more fully below.

The video controller 16 performs functions such as parallel-to-serial conversion of parallel video signals 34 received from the bolometer sensor array circuit 14 and image integration. The video controller 16 may also selectively issue control signals 32 to the bolometer sensor array 14, such as row strobe signals, to obtain desired output from the bolometer sensor array circuit 14. Video controllers, such as the video controller 16, are known in the art and may be purchased or designed and built by one of ordinary skill in the art.

Imaging software running on the computer 18 receives processed video signals from the video controller 16 and converts the processed video signals into an image. The image is subsequently displayed on the display 20. The computer 18 runs standard video software, the construction of which is known in the art. The video software may perform additional video processing functions, such as super resolution algorithms.

In the present specific embodiment, the operating frequency of the system 10 is between approximately 100 GHz and 300 GHz. This corresponds to wavelengths between 3 millimeter and 1 millimeters, respectively. The operating frequency of the system 10 may be extended to include other frequencies between approximately 10 GHz and 10 THz without departing from the scope of the present invention.

While the millimeter imaging system 10 is a passive system, those skilled in the art will appreciate that the imaging system 10 may be converted to an active system or employed in an active system without departing from the scope of the present invention.

Methods for integrating the imaging system 10 of the present invention with other types of imaging systems, such as IR imaging systems, may be adapted from the teachings of U.S. Patent Application Ser. No. 60/103,442, filed Sep. 07, 1998, entitled M-WAVE/IR MONOLITHICALLY INTEGRATED FOCAL PLANE ARRAY, assigned to the assignee of the present invention and incorporated herein by reference. Additional teachings, which may be adapted for use with the present invention are disclosed in U.S. Patent Application Ser. No. 60/103,421, filed Sep. 07, 1998, entitled ARCHITECTURE AND METHOD OF COUPLING ELECTROMAGNETIC ENERGY TO THERMAL DETECTORS, assigned to the assignee of the present invention and incorporated herein by reference.

Use of the lens 12 to reduce the wavelength of the input electromagnetic energy 26 affords significant advantages over comparable conventional millimeter wave imaging systems. Namely, requisite size of the bolometer sensor array circuit 14 is greatly reduced; image resolution and quality is improved; and SNR is greatly enhanced because it enables one to fabricate staring FPAs and therefore to use the whole frame time for pixel integration. The above advantages facilitate the accommodation of full 2-dimensional focal plane; facilitate real-time operation; eliminate the need for mechanical scanning (which reduces size and cost); and improves the performance of accompanying super resolution algorithms running on the video controller 16 and/or computer 18. The improved super resolution algorithm performance may further improve system resolution by a factor of 2 to 3.

The above advantages obviate the need for millimeter wave super heterodyne receivers or direct amplifier-detector combinations, further reducing size and costs and making full FPAs practical. Expensive millimeter wave integrated circuits are no longer necessary. The system 10 can efficiently operate at frequencies greater than 100 GHz without the need for special down-conversion and mixing circuits. This improves spatial resolution and increases signal level and quality exponentially.

Figure 2:
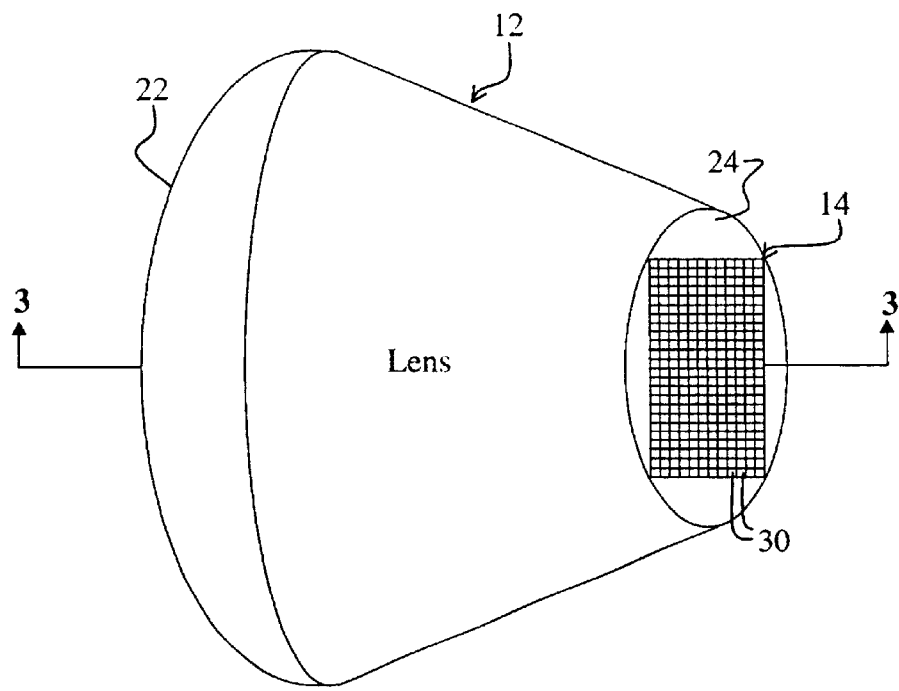
FIG. 2 is a diagram of the bolometer array circuit of FIG. 1 attached to the lens of FIG. 1.

FIG. 2 is a diagram of the bolometer sensor array circuit 14 of FIG. 1 attached to the lens 12 of FIG. 1. The bolometer sensor array circuit 14 is mounted on the output aperture 24. The lens 12 is dimensioned and shaped to focus millimeter wave electromagnetic energy onto the bolometer sensor array circuit 14. Individual pixels, i.e., detectors 30 of the bolometer sensor array circuit 14 are shown. The exact shape and dimensions of the lens 12 are application-specific and easily determined by one ordinarily skilled in the art to meet the needs of a given application.

The bolometer array sensor circuit 14 employs a staring bolometer focal plane array (FPA) constructed of vanadium oxide, $Si_3N_4$, or other material that facilitates the formation of an image in real time without requiring mechanical scanning or serial integration and without the need for expensive heterodyne array detectors or other millimeter wave circuits. The bolometer sensor array circuit 14 senses primarily emissivity and/or reflectivity differences instead of thermal differences of features within a given scene to provide an image of the scene.

The area ($A_d$) of each bolometer sensor 30, i.e., pixel or detector of the bolometer sensor array circuit 14 is chosen in accordance with the following equation to achieve desired equivalent emissivity differences (N):

$$N = \sqrt{\frac{A_d B'}{A'_d}} \; \tau_o \left(\frac{f'}{f}\right)^2 \frac{\int_{\lambda_1}^{\lambda_2} \frac{dM}{dT} d\lambda}{\frac{\Delta\varepsilon}{\varepsilon} \int_{\lambda_3}^{\lambda_4} M \, d\lambda}, \quad [2]$$

where $A'_d$ is the surface area of an exemplary infrared bolometer detector of an infrared system under comparison; B' is the bandwidth of the infrared system under comparison; f is the focal length of the lens, f is the focal length of an exemplary lens included in the exemplary infrared system under comparison; $\tau_o$ is the transmission coefficient of the lens; $\tau$ is transmission coefficient of the lens of the IR system; $\varepsilon$ is the average emissivity coefficient of the scene; $\Delta\varepsilon$ is a predetermined emissivity range of features in the scene; M is black body radiance of the scene 28; T is an average temperature of the scene; $\lambda_1$ and $\lambda_2$ are the IR wavelength boundaries; and $\lambda_3$ and $\lambda_4$ are the millimeter wavelength boundaries. The typical millimeter pixel size is $\lambda/2$. This provides adequate sampling of the image for the super resolution algorithms. The typical size of an IR pixel is 25 micrometers to 50 micrometers.

The total area of the array 14 represents a predetermined area over which variations in received electromagnetic energy are detected by the individual detectors 30. The total area is approximately $m \times A_d$, where m is the number of pixels in the array 14. In the present specific embodiment, the array 14 is full staring 256×256 pixel array having approximately 65536 detectors.

Figure 3:
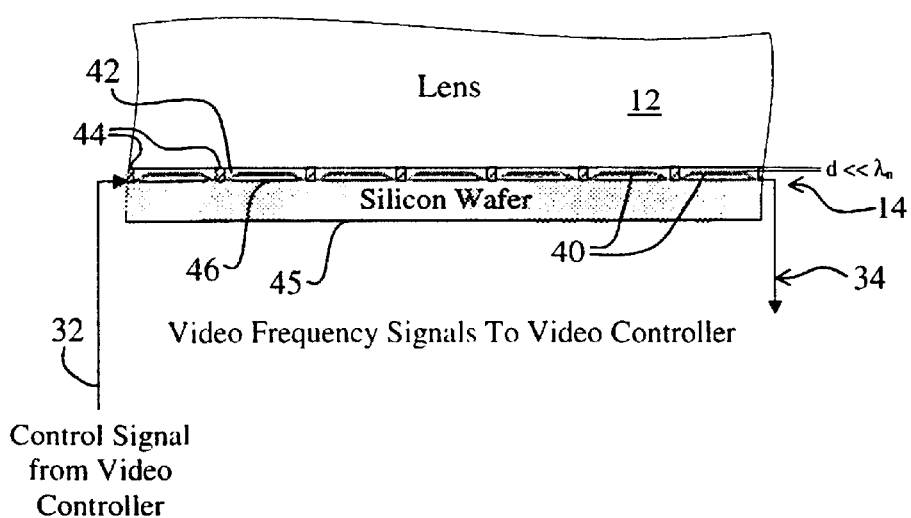
FIG. 3 is a cross-sectional diagram of a preferred embodiment of the bolometer sensor array circuit of FIG. 2

FIG. 3 is a cross-sectional diagram of a preferred embodiment of the bolometer sensor array circuit 14 of FIG. 2. The bolometer sensor array circuit 14 includes an array of bolometers 40, which are positioned in vacuums 42 and mounted on a silicon waver 45 having a thin read-out integrated circuit (ROIC) 46 integrated on the wafer 45. The array of bolometers 40 absorbs the millimeter radiation and converts it to heat. Spacers 44 support the lens 12, separating the lens 12 from the bolometers 40 and providing a separation distance (d) between the lens 12 and the bolometers 40. The separation distance d is much smaller than the wavelength ($\lambda_n$) of received millimeter wave electromagnetic energy propagating in the lens 12. Consequently, the bolometers 40 act as though they are positioned within the lens 12 and sense the shorter wavelength millimeter wave electromagnetic energy resulting from the index of refraction n of the lens 12.

Surrounding atmospheric pressure helps to ensure that all spacers 44 touch the lens 12, thereby preserving the uniformity of the bolometer-to-lens distance d. The silicon wafer 46 is sufficiently thick and the spacer-to-spacer distance is sufficiently small so that silicon-induced signal distortion is minimal.

In the present specific embodiment, the bolometers 40 are constructed of high TCR (temperature coefficient resistivity) materials in accordance with existing bolometer technologies, such as VOx bolometer, giant M-R, Pt—Si recrystalized diode, or pyroelectric detector technologies. The resistivities of the bolometers 40 change in accordance with changes in millimeter wave electromagnetic energy impinging upon the bolometers 40, which is converted to heat and, therefore, to temperature change. Temperature changes result in resistivity changes that read-out as image information.

The bolometers 40 are fabricated on top of the read-out integrated circuit (ROIC) 46. The ROIC 46 is an array that detects variations in resistivities of the bolometers 40 and outputs corresponding serial video frequency signals in response thereto to the video controller 16 of FIG. 1. ROIC circuits are known in the art and are currently in wide spread use in infrared imaging systems. A conventional ROIC, as employed in widely available infrared imaging devices, may be used for the purposes of the present invention.

In the present specific embodiment, the ROIC 46 receives control signals 32, such as row strobes, from the video controller 16 of FIG. 1 and responds accordingly. For example, if the ROIC 46 receives a row strobe control signal 32 indexed to a certain row of bolometers 40, the ROIC 46 retrieves the corresponding video signals 34 and provides them to the video controller 16 of FIG. 1.

Figure 4:
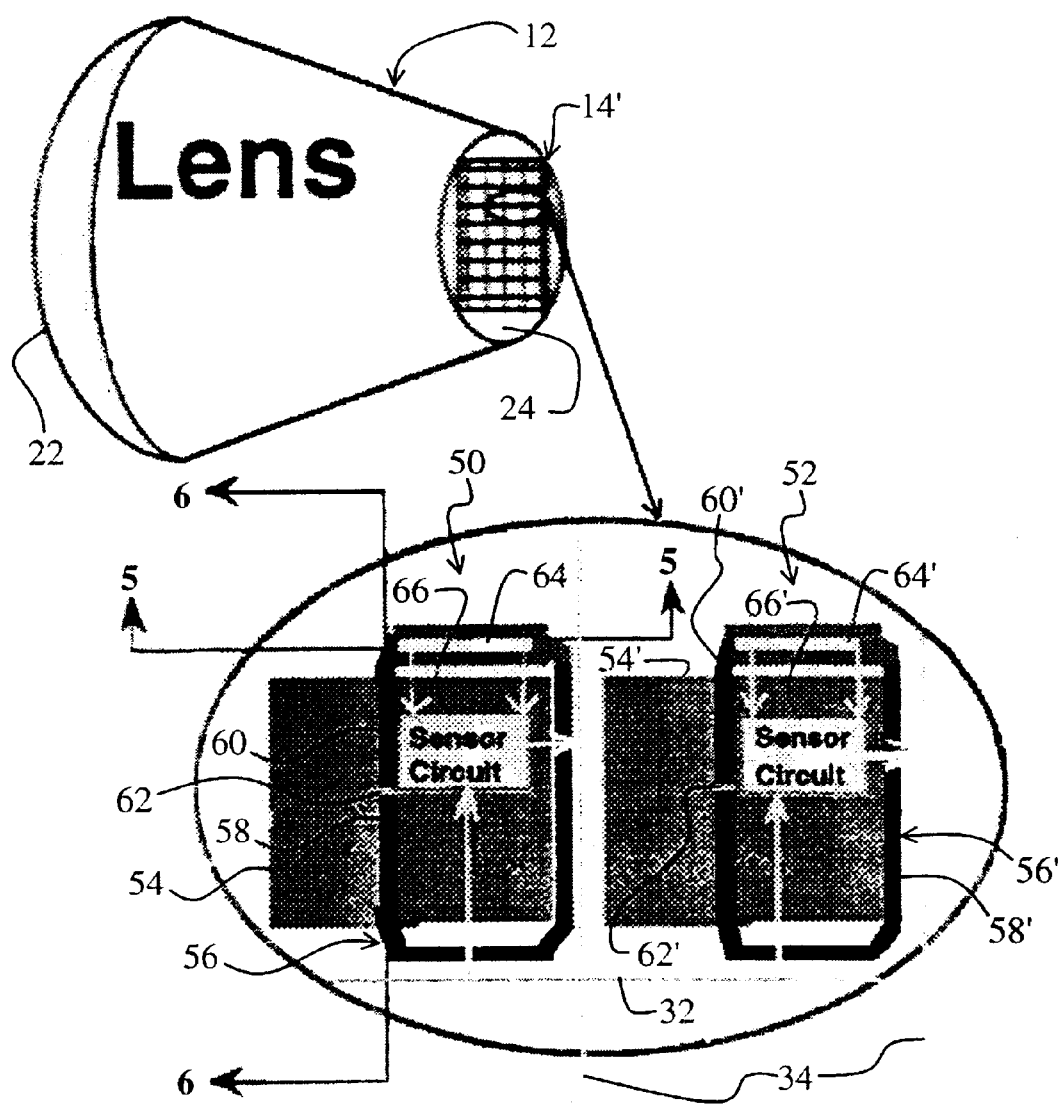
FIG. 4 is a diagram of first and second elements of an alternative embodiment of the bolometer array circuit of FIG. 2 mounted on the lens of FIG. 1 and having first and second patch antennas and first and second bolometers, respectively, as representative of an array of N×M elements.

FIG. 4 is a diagram of a first element 50 and a second element 52 of an alternative embodiment 14' of the bolometer sensor array circuit 14 (which is an array of N×M pixels) of FIG. 2 mounted on the lens 12 of FIG. 1. The first element 50 includes a first patch antenna 54 electromagnetically coupled to a first microstrip feed circuit 56. The first microstrip feed circuit 56 includes a first line 58 and a second line 60. The first line 58 and the second line 60 are separated by a first gap 62 centered over the patch antenna 54. The gap 62 is also centered over an aperture in a ground network as discussed more fully below, which runs beneath the first feed network 56 between the first feed network 56 and the first patch antenna 54.

The first line 58 is connected to one end of a first bolometer 64, and the other end of the first bolometer 64 is connected to the second line 60. A first sensor circuit element 66, which is an element of the sensor circuit array 46 of FIG. 3, has inputs connected at opposite ends of the first bolometer 64 and is partially surrounded by the microstrip feed network 56. The sensor circuit 66 also receives the control signal 32 as input and provides output corresponding to the video frequency signals 34. As mentioned above, construction of the first sensor circuit 66 is known in the art.

The first patch antenna 54 is a patch of conductive material, such as silver, deposited directly on the lens 12. The first patch antenna element 54 receives millimeter wave electromagnetic energy (see 36 of FIG. 1) having a wavelength of approximately $\lambda_o/n$, where $\lambda_o$ is the wavelength of the millimeter wave electromagnetic energy propagating in free space, and n is the index of refraction of the lens 12. $\lambda_o$ is approximately equivalent to the wavelength of electromagnetic energy propagating in air. The received millimeter wave electromagnetic energy is transferred to the first feed network 56 where first and second portions of the received electromagnetic energy propagate in opposite directions along the first line 58, and second line 60 of the first feed network 56, respectively.

The first line 58 is longer than the second line 60 by a factor of $\lambda_n/2$, where $\lambda_n$ is the wavelength of electromagnetic energy propagating in the lens 12. Consequently, the polarity of electromagnetic energy propagating via the first line 58 is inverted with respect to electromagnetic energy propagating via the second line 60, as seen from the opposite ends of the first bolometer 64. This polarity inversion doubles the effective signal across the bolometer 64, allowing for improved signal sensing.

The resistivity of the first bolometer 64 varies in accordance with variations in received electromagnetic energy. The variations may be viewed as power variations of the received electromagnetic energy per solid angle (Watts per Steradian). For millimeter wave electromagnetic energy detected by the present invention, the power variations result primarily from differences of emissivity and/or reflectivity coefficients of objects within a given scene. A typical scene will provide variations sufficient to provide at least five shades of contrast, i.e., 5 gray scale levels.

The operation and construction of the second element 52 is similar to the operation and construction of the first element 50. The second element 52 includes a corresponding second bolometer 64', a second feed network 56', a second patch antenna 54', a first feed network line 58', a second feed network line 60', and a second sensor circuit 66'.

The impedance of the microstrip feed network 56 at the first bolometer 64 matches the characteristic impedance of the microstrip feed network 56 elsewhere. In the present embodiment, the impedance of the bolometer 64 is twice the characteristic impedance of the microstrip feed network 56. The bolometer 64 is fed on both sides with opposite polarity signals. The bolometer 64 acts as a lossy transmission line, which includes inductive, capacitive. and resistive properties. The resistivity and length of the bolometer 64 are optimized to achieve maximum bolometer response. Typically, the maximum response occurs when most of the power propagating in the microstrip feed network 56 dissipates in the bolometer 64. Methods for determining the length and resistivity of the bolometer 64 that result in maximum power transfer from the microstrip 56 to the bolometer 64 are known in the art. The maximum power transfer will typically occur when the bolometer 64 is properly impedance matched with the microstrip feed circuit 56 via impedance matching techniques known in the art.

The antenna patch 54 is covered with a low-dielectric constant low-loss insulating layer (not shown). The layer is relatively thick and has a low permittivity, which helps to maximize the efficiency of the patch. The exact thickness, permittivity, and material of the insulating layer are application frequency-specific and easily determined by one ordinarily skilled in the art to meet the needs of a given application.

The electromagnetic signal from the patch antenna 54 is fed through the gap 62 in the microstrip feed network 56, and propagates in opposite directions with equal amplitudes along the first feed line 58 and the second feed line 60. As mentioned above, the first feed line 58 and the second feed line 60 differ in length by $\lambda_n/2$, resulting opposite polarity signals at opposite ends of the bolometer 64. Consequently, the effective signal across the bolometer increases by a factor of two. Conventional low-frequency video read-out circuits in the sensor circuit 66 sense changes in resistivity of the bolometer 64 due to the dissipation of received millimeter wave signals and provide image signals in response thereto.

The lens 12 focuses received millimeter wave electromagnetic signals, which correspond to a millimeter wave image, onto the array 14', which includes patch antennas similar to the patch antennas 54 and 54'. The patch antennas 54 and 54' feed the received signals through the gaps 62 to the microstrip feed circuits 56 and 56'. The millimeter wave signals subsequently propagate in both directions. As mentioned above, the bolometers 64 and 64' are thermally insulated from the lens 12 and surrounding environment by a vacuum gap as discussed more fully below. Consequently, small millimeter wave signals result in significant temperature changes in the bolometers 64 and 64'. The sensor circuits 66 and 66' include conventional low-frequency video read-out circuits to read out the bolometer array 14' line-by-line and provide image signals in response thereto.

Figure 5:
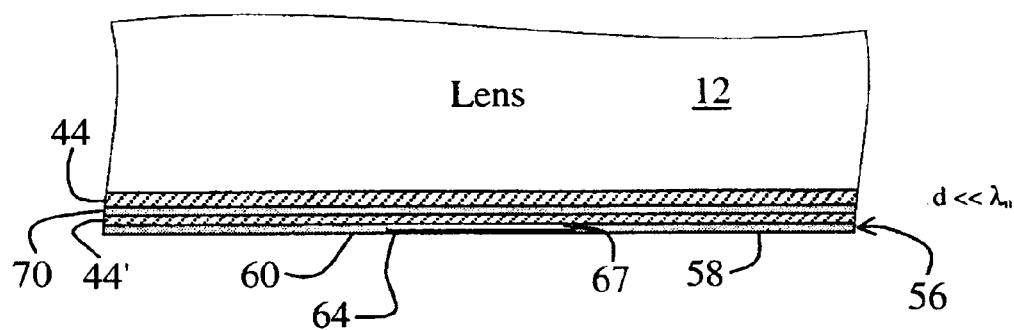
FIG. 5 is a cross-sectional diagram (5—5) of the first element of FIG. 4 showing the relative orientation of the bolometer, a ground network, and the first and second feed lines, and the lens of FIG. 4.

FIG. 5 is a cross-sectional diagram (cross-section 5—5 of FIG. 4) of the first element 50 of FIG. 4 showing the relative orientation of the bolometer 64, a ground network 70, the first network feed line 58, the second network feed line 60, and the lens 12 of FIG. 4. The ground network 70 is implemented as a microstrip conductor line made of silver or other suitable conductor that is supported by a thin dielectric layer 44 and runs beneath and parallel to the feed network 56. The exact material and associated dielectric constant of the dielectric layer 44 is application-specific and may be easily determined by one skilled in the art to meet the needs of a given application.

The feed network 56 is separated from the ground network 70 via a non-conductive thin dielectric layer 44' made of polyethylene or other suitable non-conductive material. A vacuum gap 67 is positioned adjacent to the bolometer 64 on the side of the bolometer facing the lens 12. The vacuum cap thermally isolates or insulates the bolometer 64 from the lens 12 and surrounding environment. Those skilled in the art that other types, shapes, and sizes, and positions of the vacuum gap 67 may be employed without departing from the scope of the present invention. For example, an additional vacuum gap may be positioned on the side of the bolometer 64 facing away from the lens 12.

Figure 6:
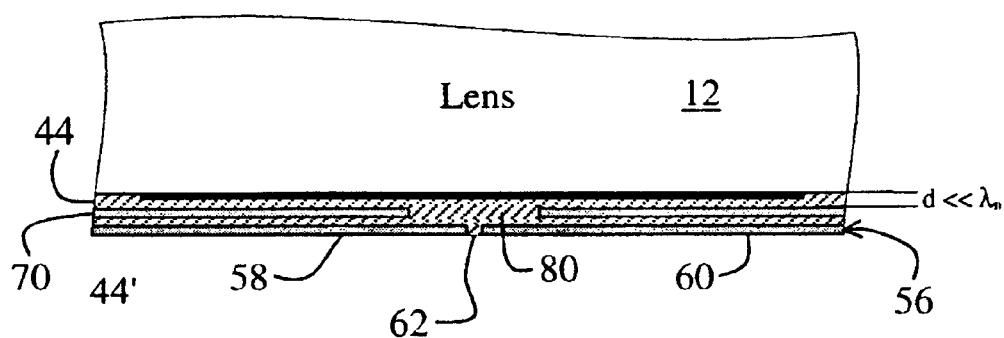
FIG. 6 is a cross-sectional diagram (6—6) of the first element of FIG. 4 showing the position of the patch antenna with relative to first and second feed lines, the ground network, and the lens of FIG. 4.

FIG. 6 is a 6—6 cross-sectional diagram (cross-section 6—6 of FIG. 4) of the first element 50 of FIG. 4 showing the orientation of the patch antenna 54 with respect to first feed network line 58, the second feed network line 60, the ground network 70, and the lens 12 of FIG. 4. The gap 62 in the feed network 56 is centered over an aperture 80 in the round network 70. The aperture is positioned directly over the patch antenna 54.

FIG. 7 is an illustrative cross-sectional diagram of an imaging system 90 constructed in accordance with the teachings of the present invention and employing the bolometer sensor array circuit 14' of FIG. 3. The imaging system 90 includes the lens 12 having an anti-reflectivity layer 92 disposed on the input aperture 22 of the lens 12 designed for millimeter wave transmission and infrared wave rejection. A cool layer 94 is disposed at the output aperture 24 of the lens 12 to further reject IR electromagnetic energy. The bolometer sensor array circuit 14' is positioned parallel to the lens output aperture 24, via a silicon support structure 96 so that a minimum spacing $d<<\lambda_n$ is provided between the sensor array circuit 14' and the lens 12. A copper spacer 96 is located between a thermoelectric cooler 100 and the bolometer sensor array circuit 14'. The support structure 96, the thermoelectric cooler 100, the spacer 98, and cool layer 94, are sealed in the vacuum 102 surrounded by side walls 104, air-tight seals 106, and a base plate 110.

The thermoelectric cooler 100 may be commercially obtained from Marlow Industries or constructed by one skilled in the art by employing the Thomson effect.

For clarity, additional circuitry, such as power lines, are not shown, but those ordinarily skilled in the art will know where and how to implement this additional circuitry with access to the present teachings. Electric conductor lines (not shown) are routed through the base plate 110 and connect a video controller/computer 108 to the bolometer sensor array circuit 14'. The video controller/computer 108 implements combined functions of the video controller 16 and computer 18 of FIG. 1, via hardware algorithms and/or software algorithms. The cool layer 94 acts as an IR radiation stop filter.

Outgassing of the lens 12 is minimized via an appropriate material over-coating sealant, such as low-temperature PCVD nitride. The sealant completely coats the lens 12.

Employing the lens 12 to reduce the wavelength of electromagnetic energy input to the bolometer sensor array circuit 14' results in several advantages over currently available millimeter wave imaging systems. Namely, image improved resolution, enhanced SNR, and expedited image acquisition time. In addition, the size and cost of the system 90 is greatly reduced relative to conventional systems. The above described systems and methods to absorb the millimeter wave radiation in the expedited image acquisition time enables video rate signals to be output from the bolometer sensor array circuit 14' without the need for expensive high-speed microwave circuits. This results in a compact, lightweight, power-efficient, and cost-effective imaging system.

The low-cost millimeter wave imaging system 90 of the present invention reduces the input wavelength $\lambda$ of detected millimeter wave electromagnetic energy via the special lens 12. The lens may have an index of refraction of greater than 9.4 if the material is chosen to be TIMC. Consequently, the input wavelength $\lambda$ is reduced by the factor 9.4, which reduces the requisite sensing area of the bolometer sensor array circuit 14' by the same factor. The SNR is also increased by approximately a factor of 10, resulting in improved image resolution and a quicker system response. Except for the microstrip feed network (see 56 of FIG. 4), no microwave circuits are employed. This enables higher frequency operation, higher angular resolution, and exponentially higher radiation power, and a corresponding reduction in noise. The built-in integration time is approximately equal to the bolometer thermal time constant, since Johnson noise may be neglected due to relatively low bolometer resistivity. In addition, all circuits operate in the kilohertz range. The system response is sufficient for video output.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. A system for providing information about a scene comprising:
   first means for receiving electromagnetic energy of a first wavelength from a scene and providing electromagnetic energy of a second wavelength in response thereto, said second wavelength shorter than said first wavelength, said first means including a lens having an index of refraction substantially greater than 1, said lens being transparent to electromagnetic energy of said first wavelength and said second wavelength, and
   second means for measuring variations of said electromagnetic energy of said second wavelength over a predetermined area and providing said information about said scene in response thereto, second means including:
      an array of patch antennas for receiving said electromagnetic energy of said second wavelength and feeding said electromagnetic energy of said second wavelength through apertures in a ground circuit and to a microstrip feed circuit, said microstrip feed circuit including a first line and a second line along which a first portion of said electromagnetic. energy of said second wavelength and a second portion of said electromagnetic energy of said second wavelength propagate, respectively, said first line being longer than said second line by a factor of $\lambda/2$, where $\lambda$ is said second wavelength and
      a bolometer connected at a first end to said first line of said microstrip feed circuit and connected at a second end to said second line of said microstrip feed circuit.

2. The system of claim 1 wherein said system is a millimeter wave imaging system.

3. The system of claim 1 wherein said variations result from differences of emissivity and/or reflectivity coefficients of features of said scene.

4. The system of claim 1 wherein said second means includes a section of material having a resistivity that varies in accordance with said variations.

5. The system of claim 4 further including a low-frequency video read-out circuit for detecting changes in the resistivity of said section of material in response to changes in electromagnetic energy received by said section of material.

6. The system of claim 5 further including an array of said sections of material, said sections of material corresponding to bolometers, said bolometers thermally isolated from a surrounding environment.

7. The system of claim 6 wherein said bolometers are included in a full frame bolometer focal plane array included in said second means.

8. The system of claim 1 wherein said lens is opaque to infrared electromagnetic energy.

9. The system of claim 1 wherein said lens is made of alumina.

10. The system of claim 1 wherein said lens is made of plastic.

11. The system of claim 1 wherein said second means includes an array of bolometers positioned relative to said lens so that said electromagnetic energy of said second wavelength impinges on said array of bolometers.

12. The system of claim 11 wherein said array of bolometers is positioned parallel to an output aperture of said lens and within a distance substantially smaller than $\lambda$ of said output aperture, where $\lambda$ is said second wavelength.

13. The system of claim 11 wherein operation frequency of said system is between approximately 10 GHz and 10 THz.

14. The system of claim 1 wherein said second means further includes an array of said microstrip feed circuits and a corresponding array of bolometers, said bolometers mounted on a substrate and connected to said microstrip feed circuits.

15. The system of claim 14 wherein said bolometers are thermally isolated from said substrate.

16. The system of claim 15 wherein said bolometers are enclosed in a vacuum.

17. The system of claim 16 further including a low-frequency line-by-line video read-out circuit for providing video signals resulting from said electromagnetic energy of said second wavelength delivered to said bolometers.

18. The system of claim 17 wherein said second means includes means for processing said video signals and displaying an image corresponding to said scene in response thereto.

19. The system of claim 1 wherein said second means includes means for rejecting infrared electromagnetic energy and passing millimeter wave electromagnetic energy.

20. The system of claim 19 wherein said means for rejecting includes an antireflectivity layer.

21. The system of claim 19 wherein said second means includes a thermoelectric cooler.

22. The system of claim 19 wherein said lens is a cool infrared-absorbing lens.

23. A millimeter wave imaging system comprising:
   a lens for receiving input millimeter wave electromagnetic energy of a first wavelength providing output millimeter wave electromagnetic energy of a second wavelength corresponding to a scene in response thereto, said second wavelength shorter than said first wavelength;

an array of sensors for detecting variations of emissivity and/or reflectivity coefficients of features within said scene based on said output millimeter wave electromagnetic energy, said array of sensors including a millimeter wave staring focal plane array of thermally isolated bolometers, wherein pixels of said millimeter wave staring focal plane array are sized in accordance with the following equation:

$$N = \sqrt{\frac{A_d B'}{A'_d}} \frac{\tau_o}{\tau} \left(\frac{f'}{f}\right)^2 \frac{\int_{\lambda_1}^{\lambda_2} \frac{dM}{dT} d\lambda}{\frac{\Delta\varepsilon}{\varepsilon} \int_{\lambda_3}^{\lambda_4} M \, d\lambda},$$

where N is the noise equivalent emissivity difference; $A_d$ is the surface area of a given pixel of said millimeter wave staring focal plane array; $A'_d$ is the surface area of an exemplary infrared bolometer array of an infrared system under comparison; B' is the bandwidth of said infrared system under comparison; f is the focal length of said lens, f' is the focal length of an exemplary lens included in said exemplary infrared system under comparison; $\tau_o$ is the transmission coefficient of said lens; $\tau$ is the transmission coefficient of said lens; $\epsilon$ is the emissivity coefficient of said scene; $\Delta\epsilon$ is a predetermined emissivity range of features in said scene; M is the black body radiance of said scene; T is a temperature associated with said scene; $\lambda_1$ and $\lambda_2$ are infrared wavelength boundaries; and $\lambda_3$ and $\lambda_4$ are millimeter wavelength boundaries; and an imaging processing circuit for generating an image corresponding to said scene based on said variations of emissivity and/or reflectivity coefficients.

24. The system of claim 23 further including duroids for optically matching said array of sensors to said lens.

25. The system of claim 23 wherein said imaging processing circuit includes a computer.

* * * * *